United States Patent [19]

Matoba

[11] Patent Number: 4,617,839
[45] Date of Patent: Oct. 21, 1986

[54] ASYMMETRIC PLANETARY GEAR ASSEMBLY

[75] Inventor: Hideyasu Matoba, Osaka, Japan

[73] Assignee: Matex Co., Ltd., Osaka, Japan

[21] Appl. No.: 747,172

[22] Filed: Jun. 21, 1985

[30] Foreign Application Priority Data

Jul. 19, 1984 [JP] Japan .................. 59-150145

[51] Int. Cl.⁴ .......................... F16H 1/28; F16H 3/44
[52] U.S. Cl. ......................................... 74/801; 74/785
[58] Field of Search ................................ 74/785, 801

[56] References Cited

U.S. PATENT DOCUMENTS 3,293,928  12/1966  Heister .................................. 74/64
3,548,673  12/1970  Suchocki ............................. 74/409

FOREIGN PATENT DOCUMENTS 30-16918  11/1955  Japan .
35-17538   7/1960  Japan .
36-22661  11/1961  Japan .
44-25692  10/1969  Japan .
54-17111   6/1979  Japan .
58-17244   2/1983  Japan .
58-94656   6/1983  Japan .
58-143466  8/1983  Japan .
59-106976  5/1984  Japan .
222102    1/1925  United Kingdom .............. 74/801

Primary Examiner—Kenneth J. Dorner
Assistant Examiner—D. Wright
Attorney, Agent, or Firm—Cushman, Darby & Cushman

[57] ABSTRACT

All gears have asymmetric side circular parts on both sides. The side circular parts contact with and roll on each other. A planetary gear has a first planetary disc and a second planetary disc as well as a planetary gear ring. The first planetary disc has a smaller disc part smaller than the tooth-root circle. The second planetary disc has a big disc part bigger than the tooth-edge circle. The outer inner-toothed gear has a gear part, a smaller cylindrical part smaller than the tooth-edge circle and a bigger cylindrical part bigger than the tooth-root circle. The sun gear has a sun gear part, a bigger column part bigger than the tooth-edge circle and a smaller column part smaller than the tooth-root circle.

After-insertion of sun gear is possible. Abnormal fitting of sun gear is prevented.

7 Claims, 8 Drawing Figures

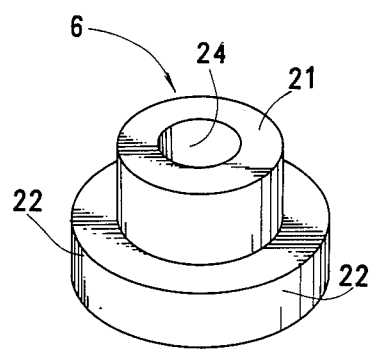
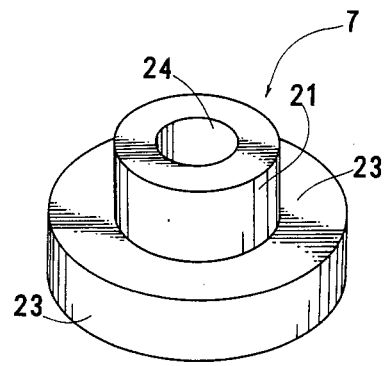
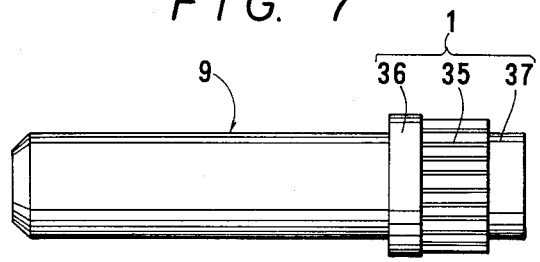
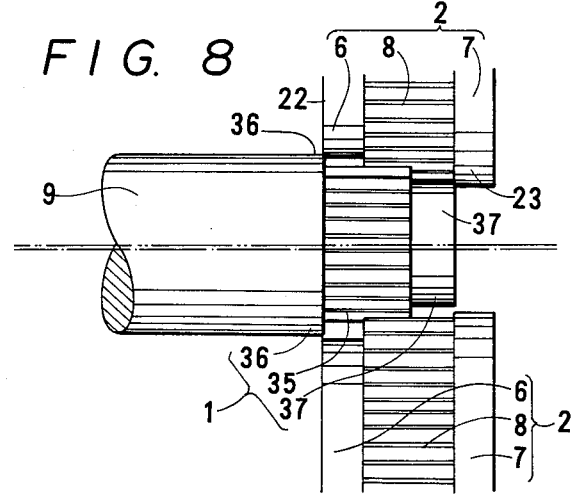

ASYMMETRIC PLANETARY GEAR ASSEMBLY

BACKGROUND OF THE INVENTION

This invention relates to a planetary gear assembly, which has a wide scope of applications as decelerator or accelerator.

Because a planetary gear assembly has many engage points between the sun gear and the planetary gears, or the planetary gears and the outer inner-toothed gear, it is difficult to equalize the forces acting on all engage points at the same time. Raising accuracy of finishing does not always bear a good result.

Excess deep engagements of gears generate great noises and vibrations which result in a big loss of energy.

There are such planetary gear assemblies which have pitch discs and pitch rings coaxially fitted on gears to prevent excess deep engagements of gears.

In the planetary gear assemblies having pitch discs or pitch rings fitted on sides of the gears, radial forces are transmitted by the pitch discs and the pitch rings.

Therefore even if the sun gear shaft or the planetary gear shafts deviate a little from the normal points, the gears do not engage with each other excessively.

For example, U.S. Pat. No. 3,293,928 ( issued on 27, Dec. 1966 ) disclosed an improved torque converter having outer-toothed gears and an inner-toothed gear which are engaged with each other. The outer-toothed gears have side disc parts whose diameter is same with that of the pitch circle of the gear. The inner-toothed gear has side ring parts whose inner diameter is same with that of the pitch circle of the gear. The gears and the discs, or the rings are made in a body.

U.S. Pat. No. 3,548,673 ( issued on 22, Dec. 1970 ) disclosed improved spur gears and bevel gears. The spur gear has a side friction roller whose diameter is same with that of the pitch circle of the gear. The bevel gear has a side friction cone which is defined by the extension of the pitch cone of the bevel gear.

It was difficult to determine the amount of backlashes between teeth at engage points. To avoid the difficulty of determining the optimum backlashes, these inventions proposed friction side rollers, rings or discs with pitch circle diameters to transmit radial forces therebetween.

These inventions related to general gears improved by fitting side pitch discs or pitch rings coaxially on both sides or one side of the gears.

There are several prior arts relating to planetary gear assemblies using such complex gears.

Japanese utility model publication No. 16918/55 proposed an improved planetary gear assembly in which pitch rollers were fitted on sides of the planetary gears and a pitch cylinder was formed on a side of the outer inner-toothed gear.

The pitch rollers contact with and roll on the inner wall of the pitch cylinder. Radial pressures are transmitted by the pitch rollers and the pitch cylinder. The gears transmit only rotation forces. This prevents an occurence of an excess deep engagement between gears. This was an excellent utility model.

However in this apparatus a pitch roller and a planetary gear were mounted at separate spots on a long planetary shaft. Because the planetary shaft was long, the casing of the apparatus was also long in the axial direction. As a whole the apparatus was larger and heavier than the conventional one. This raised the cost for manufacturing.

There were another prior arts which intended to overcome the intrinsic difficulties of planetary gear assemblies by another contrivance.

This contrivance made planetary wheels from elastic materials to absorb the disengagement by the elastic deformations.

For example Japanese utility model publication No. 25692/69 pertains to this category. Instead of gears, this uses planetary friction rollers made from rubber or other elastic material. The elastic rollers deform at the occurrence of disengagement between rollers.

However friction rollers cannot transmit a big torque, because many slippages happen between the engagement. Frequent repititions of shrinkage and dilation are liable to wear the rollers. Slippages generate friction heat. This assembly cannot transmit big torques, because it uses friction rollers instead of gears.

The idea of elastic deformation is unapplicable to planetary gear assemblies. Two pitch circles must be contact with each other in order to engage two gears. Elastic deformation would separate the pitch circles, which would destroy the engagement condition.

A third solution was proposed e.g. by Japanese utility model publication No. 17538/60 or Japanese patent publication No. 22661/61.

Instead of the direct coupling of a planetary gear and a planetary shaft, an indirect coupling through an intermediate wheel is adopted. A planetary gear consists of a gear ring and an intermediate wheel. The gear ring can rotate with regard to the intermediate wheel, because of an enough clearance between them.

The clearance allows slight displacements of gear rings in arbitrary directions with regard to the planetary shaft. The displacement can equilibrate the probable discoordinations at the engagement points. It requires no pitch discs nor pitch rings.

The planetary gear assemblies of the clearance type are not sufficient to equalize the forces between the engagement points. This type would be fully advantageous, if a sun gear and a carrier supporting planetary gears can freely displace in radial directions. But if the sun gear cannot displace, the clearance type would not be effective without large backlashes between gears.

However this Inventor considers most effective device to equalize the forces of engagement points is the third proposal—the clearance type.

As mentioned in detail, three different technological ideas have been proposed to resolve the difficulty of the simultaneous coordination of engagement points. They are classified as follows;

Type (1) pitch-circle, pitch-ring type
Type (2) elastic deformation type
Type (3) clearance type Type (1) seems attractive. If pitch discs are coaxially fitted to planetary gears and a pitch ring is coaxially fitted to an outer inner-toothed gear, the rotation speeds of gears and discs are rigorously equal. No slippage happens between the circumferences of the pitch discs and the pitch ring. This would ensure a regular rotations of the planetary gears.

An improvement combining Type (1) and Type (2) was proposed by Japanese patent publication No. 17111/79 (published on June 27, 1979).

In the proposed apparatus, a planetary gear consists of a thin ring gear and two pitch discs supporting the ring gear. The thin ring gear deforms easily. The pitch discs have inner platforms for sustaining the inner surface of the ring gear.

The gear rings are apt to deform locally at the tooth-root by the action of force.

The tooth-root of the tooth on which bigger torque acts would deform stronger. The localized deformations of gear rings in proportion to the torques acting thereon would alleviate the excess torque. Transmitting torques for each planetary gear would be equilibrated.

However this Inventor think the proposed apparatus has another intrinsic difficulty.

Unlocalized deformation of gear ring as a whole must precede the localized deformation of a tooth-root, because localized deformation requires much stronger torque than unlocallized elliptical deformation. If a planetary gear ring deforms into an ellipse, the pitch circles of planetary gear and an outer inner-toothed gear or a sun gear would separate from each other. The separation of pitch circles destroy the engagement condition. Thus elliptical deformation—unlocalized deformation—should be suppressed.

In order to deform only tooth-roots of gear ring locally without the occurrence of elliptical deformation, both sides of the gear ring should be fixed by the inner platforms of the pitch discs. But rigorous fixation of the gear ring would reduce the probability of the deformation of the tooth-root.

Furthermore this Inventor knows well that the deformation of the tooth-root—most important feature of the proposal—hardly happens in practice.

We assume the transmitting torques acting upon three or four planetary gears are different with each other. The planetary gear ring on which a larger torque is acting would deform bigger at the tooth-root of the tooth engaging with other gears. The deformation of the tooth-root delays the phase of the tooth-train of the planetary gear ring. The phase delay alleviates the excess torque acting on the tooth of the planetary gear ring.

Even if the torque differences would be reduced, the amount of the deformations of the tooth-roots differs in proportion to the differences of the transmitting torques.

The torques transmitted between each planetary gear and the sun gear become different. The torque difference causes an extraordinary radial force acting on the sun gear. The radial force generates an excess engagement between a planetary gear and the sun gear. The excess engagement would incur low transmission efficiency, large noise and big vibration of the planetary gear assembly.

This Inventor has been reseaching, developing, manufacturing and selling various kinds of planetary gear assemblies for long years. He has manufactured and tested some of the proposed planetary gear assemblies mentioned till now in practice.

Considering the long experiences, he becomes aware that Type (3)—clearance type—is most effective to equalize forces between all planetary gears.

Therefore this Inventor proposed an improved planetary gear assembly combining the features of Type (1) and Type (3). It was Japanese patent application No. 114824/81 (laying open No. 17244/83 laid on Feb. 1, 1983).

The reason why the elastic deformation type is ineffective has already explained. They say unequal elastic deformations of planetary gears will equalize the forces acting on them. However according to the Fuch's law the elastic deformation is in proportion to the force acting thereon. Existence of unequal elastic deformations signifies an existance of unequal forces acting on the planetary gears.

The existence of unequal forces does not alleviate the discoordination between three or four engagement points, because unequal forces make the engagements different with each other.

This Inventor thinks it is most desirable to equalize all transmission torques acting on all planetary gears at all times by sufficient backlashes between gears.

This Inventor feels a question about the improvement Type (1)—pitch-disc, pitch-ring type.

If pitch-discs and pitch-rings were to be true circles without errors, the pitch-discs could always contact with the pitch-rings.

In practice pitch discs and pitch rings could not be true circles in a rigorous meaning. All manufacturings of gears are accompanied with errors. In usual the inner diameter of a pitch ring should be slightly bigger than that of a theoretical pitch circle and the outer diameter of a pitch disc should be slightly smaller than that of a theoretical pitch circle.

In practical manufacturing allowable errors are allotted so as to separate the pitch discs from the pitch rings with a considerable clearance therebetween.

Therefore the pitch rings fitted on both sides of an outer inner-toothed gear do not always contact with the pitch discs fitted on both sides of planetary gears. Rather the time in which they contact may be shorter than the time in which they separate.

They will contact with each other under special conditions, for example, in which the pitch rings are not ture circle but are akin to an ellipsoid and the planetary gear is positioned at a region of shorter radius of the ellipsoid pitch ring, in which strong centrifugal forces forcibly push the pitch discs onto the pitch rings, or in which the planetary gear assembly is errected in a vertical plane, some clearance exists between a sun gear and a sun gear shaft, and the pitch discs of the lowest-positioned planetary gear will contact with the pitch rings by the weight of the carrier.

But in usual cases the pitch discs separate from the pitch rings because of the minus size tolerance allotted to discs and rings.

Then this Inventor became aware that the requirement to contact the discs with the rings on their pitch circles is not so absolute. Line velocities of the gears engaged therewith are equal only on their pitch circles. Conventional thoughts were used to put an important significance on pitch circles, because of the equality of line velocities.

However this Inventor considered it is more preferable to contact the discs with the rings on their tooth-edge circles and tooth-root circles instead of on their pitch circles. As mentioned before, the discs and the rings do not always contact with each other because of the minus size tolerances of them. They separate at nearly all times. Practical separation of the discs from the rings will greatly reduce the importance of the equality of line velocities.

Pitch discs and pitch rings prevent the planetary gears from sliding out of the outer inner-toothed gear in the axial direction. However it is only narrow tooth edge part with one module height that contacts with the sides of the pitch rings or the pitch discs. The narrow tooth edge are inclined to be defaced by the contacts with the pitch rings or the pitch discs. This is a disadvantage of the pitch-disc, pitch-ring type. Another disadvantage is an insufficient transmission of an axial thrust.

Then this Inventor invented a novel planetary gear assembly in which planetary side discs have an outer diameter bigger than that of the tooth-edge circle of planetary gears and outer side cylindrical parts have an inner diameter bigger than that of the tooth-root circle of outer inner-toothed gear (Japanese patent application No. 193113/81, Japanese patent laying open No. 94656/83, laid open on June 4, 1983).

The planetary gear assembly has an advantage that the number of necessary parts is reduced, because the outer inner-toothed gear can be manufactured in a body. For simplicity the improved planetary gear assembly is now called a "toothe-edge-disc" type, although it contains planetary side discs with tooth-edge circle and outer side cylindrical parts with tooth-root circle.

In agreement with the simplified definition, the pitch-disc, pitch-ring type will be called "pitch-circle" type from now. In the pitch-circle type, an outer inner-toothed gear consists of the parts—one gear ring and two side pitch rings. Because the inner diameter of the pitch rings is equal to that of the pitch circle of the gear, the rings must be manufactured as individual parts.

On the contrary in the newly-proposed tooth-edge-disc type, an outer inner-toothed gear is a single article consisting of a gear part and two side cylindrical parts. Because the inner diameter of the side cylindrical parts is bigger than the tooth-root circle, the existence of the side cylindrical parts does not hinder the shaping of the teeth part in the middle.

The planetary gear assemblies both of the pitch-circle type and the tooth-edge disc type have a sun gear which is tightly settled into a central space enclosed with planetary discs and gear rings. The sun gear cannot be extracted out of the space, because the periphery of the sun gear is held between the peripheries of the planetary side discs.

Instead of fitting an independent sun gear on an end of input shaft, a sun gear can be directly shaped on an end of input shaft. This type of input shaft is safely called a "sun shaft".

Such a sun shaft is always available for conventional planetary gear assemblies, because they have no discs which would hinder the penetration of sun shaft.

However in the improved planetary gear assemblies having side discs or rings, a sun gear cannot be inserted into the center position enclosed by the planetary gears because of the side discs and rings, after the gear assemblies are constructed. This is inconvenient. It is desirable that a sun gear can easily be engaged or disengaged with planetary gears after the assembly is manufactured.

Therefore this Inventor invented an asymmetric planetary gear assembly whose planetary gear has a single side disc (Japanese patent application No. 143466/83 filed on Aug. 5, 1983). The single side disc has a diameter larger than that of the tooth-edge circle of planetary gear. The outer inner-toothed gear has a corresponding single side cylindrical part whose inner diameter is wider than that of the tooth-root circle. A sun shaft can be inserted in or extracted from the central position enclosed by the planetary gears from the vacant side.

However this asymmetric planetary gear assembly has a defect. The noise is not effectively suppressed, because the discs and cylindrical parts contact only on one side of the gears and the radial forces acting on the gears were not fully cancelled by the side discs and rings.

Then this Inventor invented another asymmetric planetary gear assembly in which each planetary gear has two asymmetric side discs and the outer inner-toothed gear has two asymmetric side cylindrical parts (Japanese patent application No. 106976/84, filed on May 26, 1984). This is an extraordinary planetary gear assembly.

One side disc of the planetary gear has a small circular part which is smaller than the tooth-root circle. Another side disc of the planetary gear has a big circular part which is bigger than the tooth-edge circle. A sun gear or sun shaft can be inserted from the side of the smaller side disc.

Corresponding to the planetary gears, the outer inner-toothed gear has a side small cylindrical part whose inner diameter is smaller than that of the tooth-edge circle and another side big cylindrical part whose inner diameter is bigger than that of the tooth-root circle. Because the outer inner-toothed gear is an inner-toothed gear, the tooth-root circle is bigger than the tooth-edge circle.

The big circular parts of the planetary gear discs contact with the big cylindrical part of the outer inner-toothed gear. The small circular parts of the planetary gear discs contact with the small cylindrical part of the outer inner-toothed gear.

Of course gears exist between the side discs and the side cylindrical parts. Rotation torque is fully transmitted by the gears.

However radial forces are transmitted by the side discs and the side cylindrical parts.

The planetary gears, the side discs and the another side discs have different line velocities, because the side discs are bigger than the pitch circle and the another side discs are smaller than the pitch circle. Only the side disc whose diameter is equal to that of the pitch circle has a line velocity same with gear.

However this Inventor has discovered that these differences of line velocities would bring about no fatal difficulties by many repetitions of experiments.

In the case of slow rotation, the differences of line velocities hardly have influence upon the motions of planetary gear assembly.

In practice there are considerable clearances between the discs and the gears, and between the discs and the cylinder parts. These clearances allow slippages of the planetary side discs. The slippages cancel the differences of the line velocities.

The reason why the side discs and side cylindrical parts are asymmetric is because a sun gear can be inserted and engaged after the planetary gear assembly is constructed. This would allow a convenient variation of sun gear and input shaft. In the special case of the sun gear directly shaped at an end of a motor shaft or a reduction-gear shaft, the sun gear can be inserted into the planetary gear assembly after it is fixed into a casing.

The possibility that the sun gear can be inserted into the space enclosed by planetary gears after the planetary gear assembly is constructed is briefly called "after-insertion of sun gear" for simplicity.

The after-insertion of sun gear is always possible in conventional planetary gear assemblies without side discs or side rings.

However in the improved planetary gear assemblies whose planetary gear have pitch-circle discs or toothedge-circle discs, the after-insertion of sun gear becomes impossible.

The asymmetric planetary gear assembly contrived by this Inventor allows the after-insertion of sun gear same as conventional planetary gear assemblies.

However this Inventor became aware that a misfit on construction frequently occurred when a sun gear was inserted after the planetary gear assembly was fully constructed. The misfit was an erroneous engagement between the sun gear teeth and the planetary gear teeth. Such misfit happened in conventional planetary gear assemblies also.

An input shaft having a sun gear part at its end is called a sun shaft. Because the sun gear is unable to separate from the shaft, it is an important problem whether the sun gear can be inserted after the planetary gear assembly is constructed.

We consider a constructed planetary gear assembly which only lacks of a sun gear. The planetary gears supported on the carrier by planetary shafts engage with an outer inner-toothed gear. The number of planetary gears is three or four.

In usual case the space enclosed by three or four planetary gears is visible from its front. However if grease is filled in the space for heightening lubricity of the teeth, the tooth-edges of the planetary gears becomes invisible, because they are covered by the grease.

Because three or four planetary gears engage an outer inner-toothed gear, tooth-phase relation among all planetary gears should be determined. Accordingly when a sun shaft is inserted into the central space enclosed by the planetary gears, the sun gear part is held by the planetary gears in a appropriate tooth-phase relation. In this case the sun gear part slides smoothly, on the planetary gear teeth. This engagement is called "normal fitting" from now.

However some backlashes exist at an engagement of two gears. Some clearances exist between a shaft and a shaft hole of gear. Because of the backlashes and clearances, the teeth on the free side of planetary gears can slightly displace in angular direction. Maximum angular displacement of teeth is often as big as a tooth pitch, if the backlashes and clearances are big. In this case, a misfit of a sun gear by one tooth may occur. Namely the tooth of the sun gear is inserted into a tooth-valley next to the appropriate tooth-valley of a planetary gear. This error is called "misfit" from now.

Of course misfit is apt to occur in small planetary gear assemblies whose "gear module" is small. Here "gear module" or "module" is a well-defined technical term. This is a fundamental value of gears. Module is defined as a quotient of pitch-circle diameter divided by teeth number.

But even in large planetary gear assemblies with a big gear module, the misfit operation occurs at times, especially if unskillful workers construct them. The relation of the sun gear to the planetary gears in a misfit engagement is called "abnormal fitting".

In the case of abnormal fitting, the sun gear does not slide in smoothly and the worker feels some resistance. Despite the resistance and unsmoothness the sun gear can be fully inserted into the central space enclosed by the planetary gears. When the worker rotates the sun shaft under the abnormal fitting, she can feel abnormally heavy resistance.

Skillful workers do not commit such a primary error. But unskilled workers are apt to fail the sun gear insertion. The probability of occurrence of abnormal fitting is small. Although the probability depends upon the skill of workers, the amount of backlashes or clearances and the gear module, it is about one hundredth according to the Inventor's experience.

Though the probability is small, the abnormal fitting is such an error which should be forbidden to perfection, because it is difficult to find out the planetary gear assemblies in abnormal fitting after they are constructed.

The planetary gear assemblies in abnormal fitting dissipate much energy in vain, because teeth faces rub against each other with strong forces. The life time is very short, for example less than one hundred hours. The misfit is a fatal defect.

If the number of planetary gears is four, the probability of abnormal fitting is very small. However if the number of planetary gears is three, the probability of abnormal fitting is comparatively big. Especially it would happen with high frequency when unskilled workers insert a sun shaft into a grease-filled space enclosed by planetary gears.

One object of this invention is to forbid the occurrence of abnormal fitting of the planetary gear assembly on construction.

The sun gear in an abnormal fitting is engaged with the planetary gears at an erroneous tooth-valley next to the correct tooth-valley. The abnormal fitting is a misfit by one tooth-valley.

The reason why the abnormal fitting occurs is because the misfit by one tooth-valley cannot hinder the insertion of sun gear.

If the misfit prevents the sun gear from inserting into the central space enclosed by planetary gears, the abnormal fitting does not occur. The central space is called "sun gear space" from now.

In general a tooth is intersected at the middle height by the pitch circle. The distance between the tooth-edge and the pitch-circle intersection is 1 module. The distance between the tooth-root and the pitch-circle intersection is 1.25 modules. The 0.25 module surplus is an extra space to prevent a tooth-edge from thrusting a tooth-bottom of the gear in engagement.

The 0.25 module surplus, the backlashes of tooth faces, and the clearances between a shaft and a gear hole permit a sun gear to enter the sun gear space even in an abnormal fitting.

Under an abnormal fitting the center of sun gear does not coincide with the center of three or four planetary shafts. Two centers deviate from each other. The center of sun gear is briefly called "sun-center". The center of planetary shafts is simply called "planet-center".

In order to prevent an abnormal fitting, a device for decting the center deviation and a device for forbidding the sun gear entrance in case of the center deviation should be given.

This Inventor considered that two sun discs which would contact with and roll on the planetary discs should be fitted on both sides of a sun gear. Newly-mounted sun discs would prevent the occurrence of abnormal fitting.

If a misfit would happen, the sun-center deviates from the planet-center. The side surfaces of the sun discs collide with the side surfaces of the planetary discs because of the center deviation. Therefore the sun gear cannot be inserted into the sun space. This isan evidence of occurrence of abnormal fitting. Even an unskilled worker is aware of the occurrence of misfit. What the worker should do is to pluck out the sun shaft and to insert again. This is an easy operation. But it is enough to prevent the occurrence of abnormal fitting to perfection.

SUMMARY OF THE INVENTION

One object of this invention is to provide an asymmetric planetary gear assembly in which an abnormal fitting is fully forbidden.

Other object of this invention is to provide an asymmetric planetary gear assembly of low noise and low vibration.

Another object of this invention is to provide an asymmetric planetary gear assembly with a high transmission efficiency.

Further object of the invention is to provide an asymmetric planetary gear assembly with a high reduction rate.

The asymmetric planetary gear assembly of this invention comprises a sun gear, planetary gears, an outer inner-toothed gear and a carrier, in which planetary gears have side discs of different diameters, the outer inner-toothed gear has side cylindrical parts of different inner diameters on which the planetary side discs contact and roll, and the sun gear can be inserted after construction, characterized in that the sun gear has a side smaller column part and a side bigger column part which contact with and roll on the planetary side discs.

In this invention planetary gears, a sun gear and an outer inner-toothed gear have side discs, side column parts and side cylindrical parts on both sides. However the side parts are not of a same size. Here "side parts" include side discs, side column parts and side cylindrical parts.

One side part is bigger than the tooth-edge circle and another side part is smaller than the tooth-root circle for outer-toothed gears. The relation is reversed for an inner-toothed gear.

With regard to the planetary gears one side disc is smaller than the tooth-root circle. This side disc permits an after-insertion of sun gear from this side.

Another side disc is bigger than the tooth-edge circle. Then the corresponding cylindrical part of the outer inner-toothed gear is wider than the tooth-root circle. This enables us to manufacture the outer inner-toothed gear in a body. The outer inner-toothed gear is a single article although it comprises a gear part and side cylindrical parts.

Features of the planetary gear assembly of the invention is now clarified.

In the planetary gear assembly of this invention,
(1) A planetary gear comprises
 (a) a ring-shaped planetary gear ring
 (b) a first planetary disc having a smaller disc part smaller than the tooth-root circle in diameter, an inner cylinder part for sustaining the planetary gear ring and a shaft hole perforated therethrough,
 (c) a second planetary disc having a bigger disc part bigger than the tooth-edge circle in diameter, an inner cylinder part for sustaining the planetary gear ring and a shaft hole perforated therethrough,
(2) An outer inner-toothed gear comprises
 (a) a gear part for engaging with the planetary gear ring,
 (b) a smaller side cylindrical part smaller than the tooth-root circle in inner diameter for contacting with and rolling on the smaller disc part of the first planetary disc,
 (c) a bigger side cylindrical part bigger than the tooth-edge circle in inner diameter, for contacting with and rolling on the bigger disc part of the second planetary disc,
(3) A sun gear comprises
 (a) a sun gear part for engaging with the planetary gear ring,
 (b) a side bigger column part bigger than the tooth-edge circle of sun gear, for contacting with and rolling on the smaller disc part of the first planetary disc,
 (c) a side smaller column part smaller than the tooth-root circle of sun gear, for contacting with and rolling on the bigger disc part of the second planetary disc.

The radius difference between the smaller column part and the tooth-root circle of sun gear is 0 to 2 modules.

The radius difference between the bigger column part and the tooth-edge circle of sun gear is 0 to 2 modules.

The radius difference between the smaller disc part and the tooth-root circle of planetary gear is 0 to 2 modules.

The radius difference between the bigger disc part and the tooth-edge circle of planetary gear is 0 to 2 modules.

The radius difference between the smaller cylindrical part and the tooth-edge circle of the outer inner toothed gear is 0 to 2 modules.

The radius difference between the bigger cylindrical part and the tooth-root circle of the outer inner-toothed gear is 0 to 2 modules.

Sun gear can be either an individual gear or a gear-shaped part formed on an end of a shaft.

BRIEF DESCRIPTION OF THE DRAWINGS

FIG. 5 is a perspective view of a first planetary disc.

FIG. 6 is a perspective view of a second planetary disc.

FIG. 7 is a side view of a sun shaft.

FIG. 8 is a schematical side view of a sun gear and planetary gears in an abnormal fitting.

DETAILED DESCRIPTION OF THE EMBODIMENT

Figure 1:
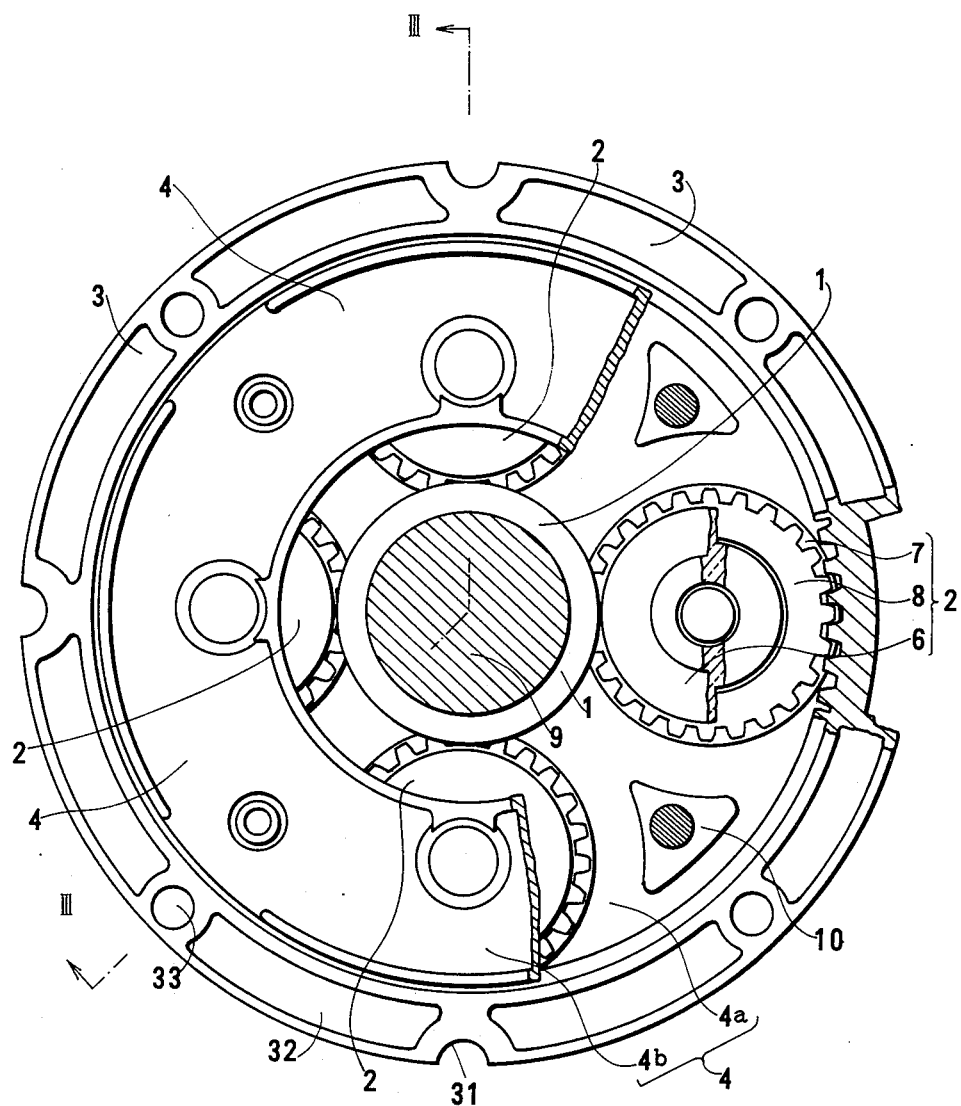
FIG. 1 is a partially sectioned front view of an embodiment of the planetary gear assembly of this invention.
Figure 2:
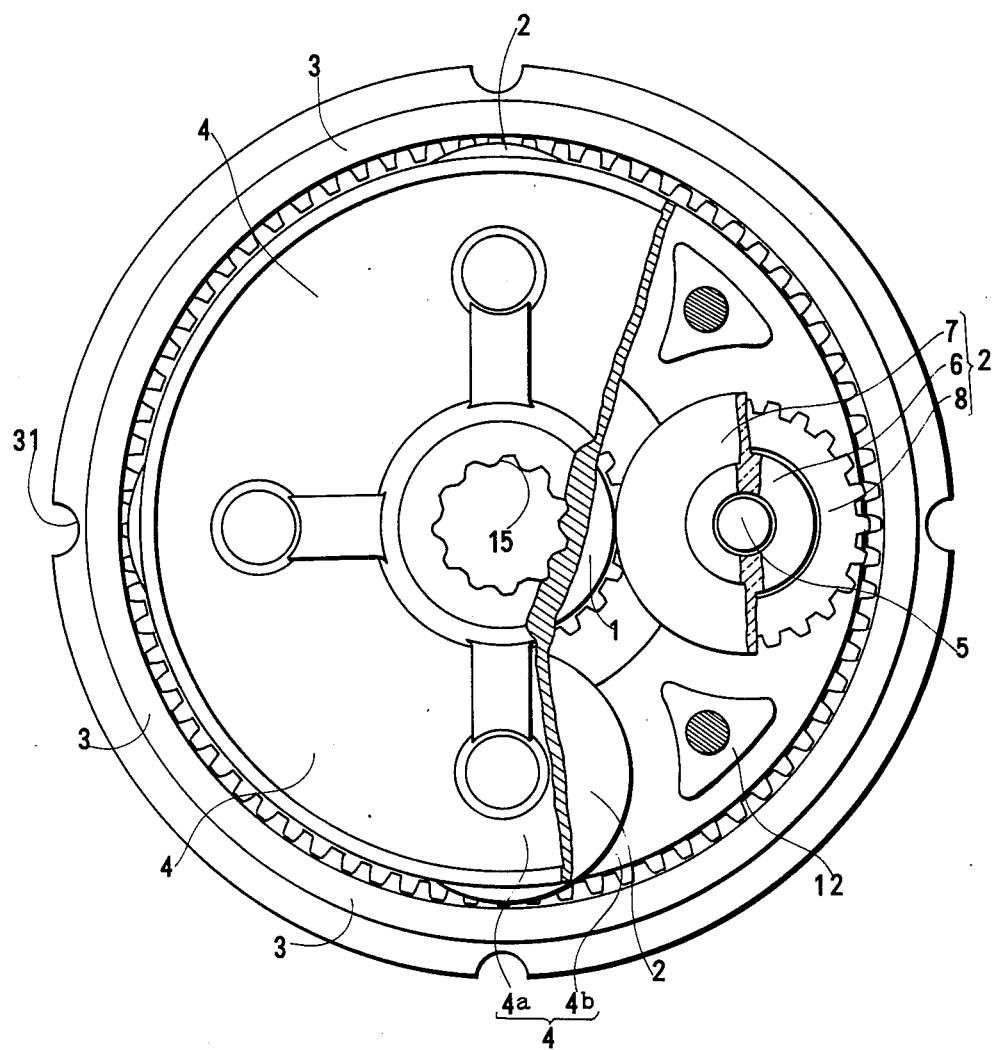
FIG. 2 is a partially sectioned rear view of the same embodiment.

A planetary gear assembly has a sun gear (1) in the center. In the planetary gear assembly of this invention a sun gear (1) can be inserted after the assembly is constructed.

At this point this invention is clearly distinguished from the prior arts—Japanese patent publication No. 17111/79, Japanese patent laying open No. 17244/83 and Japanese patent laying open No. 94656/83.

In these planetary gear assembly a sun gear space at which the sun gear should rest is blocked by the side discs of planetary gears. After-insertion of sun gear is forbidden.

However in this invention after-insertion of sun gear is fully allowable, because planetary discs of one side are smaller than tooth-root circle of planetary gear.

The planetary gear assembly of this invention comprises a sun gear (1), three or four (four in this example) planetary gears (2) for enclosing and engaging with the sun gear (1), an outer inner-toothed gear (3) enclosing and engaging with the planetary gears (2), and a carrier (4) rotatively supporting the planetary gears (2) at the positions with a rotation symmetry.

Planetary shafts (5) hold the planetary gears (2) on the carrier (4), permitting free rotation of the gears (2). Namely the planetary shafts (5) pierce the planetary gear holes. Both ends of the planetary shafts (5) are fixed on the carrier (4).

The planetary gear (2) consists of a planetary gear ring (8) having teeth on its outer surface, a first planetary disc (6) and a second planetary disc (7).

Three parts are loosely coupled. As a whole the planetary discs (6) and (7) are not equivalent.

The carrier (4) consists of a main carrier disc (4a) and a sub-carrier disc (4b). Two carrier discs are tightly coupled.

On the inner surface of the main carrier disc (4a), protrusions (10) having plug parts (11) thereon are formed at the position with rotation symmetry. The protrusions (10) lie at the middle points between neighbouring planetary shafts (5).

At the corresponding positions of the inner surface of the sub-carrier disc (4b), protrusions (12) having socket holes (13) are formed.

Both carrier discs (4a) and (4b) are coupled by inserting the plug parts (11) of the main carrier disc (4a) into the socket hole (13) of the sub-carrier disc (4b).

The carrier (4) can be made either from plastics or from metals.

In the case of plastic carrier, the coupling of two carrier discs is reinforced by using appropriate adhesive. Otherwise it is reinforced by ultrasonic bonding of the projecting plug parts (11) around the socket holes (13).

However in this embodiment the carrier discs (4a) and (4b) are produced by alminium die-casting. When two carrier discs (4a) and (4b) are coupled, the plug parts (11) project outward from the socket holes (13). Then the top ends of the plug parts (11) are crushed. The crushed parts (28) tighten the coupling of the carrier discs.

Of course the carrier discs can be made from steel. In this case two carrier discs are coupled by connecting steel bars whose ends are welded on the outer surfaces of the carrier discs. Otherwise they are coupled by rivets.

There is a central protuberance (14) in the center of the outer surface of the main carrier disc (4a).

A carrier shaft hole (15) is perforated along an axial direction through the central protuberance (14).

Spline or serration is formed in the carrier shaft hole (15). An output shaft (in case of decelerator) should be inserted into the carrier shaft hole (15).

Planetary-shaft-fixation holes (16) are bored at the middle positions between neighboring protrusions (10) or (12) on the inner surfaces of the carrier discs (4a) and (4b). Both ends of the planetary shafts (5) are inserted and fixed in the planetary-shaft-fixation holes (16).

There is an aperture (17) at the center of the sub-carrier disc (4b). Through the aperture (17) the sun gear (1) can be inserted into or extracted from the gear space.

With regard to the sun gear (1), both of an individual gear and a gear part shaped at an end of a shaft are available. These figures show the example of a sun gear shaped at an end of a sun shaft (9).

A pitch circle (18) of the planetary gear (2) is shown by the half-dotted line. A tooth-root circle (19) is smaller than the pitch circle (18).

Figure 3:
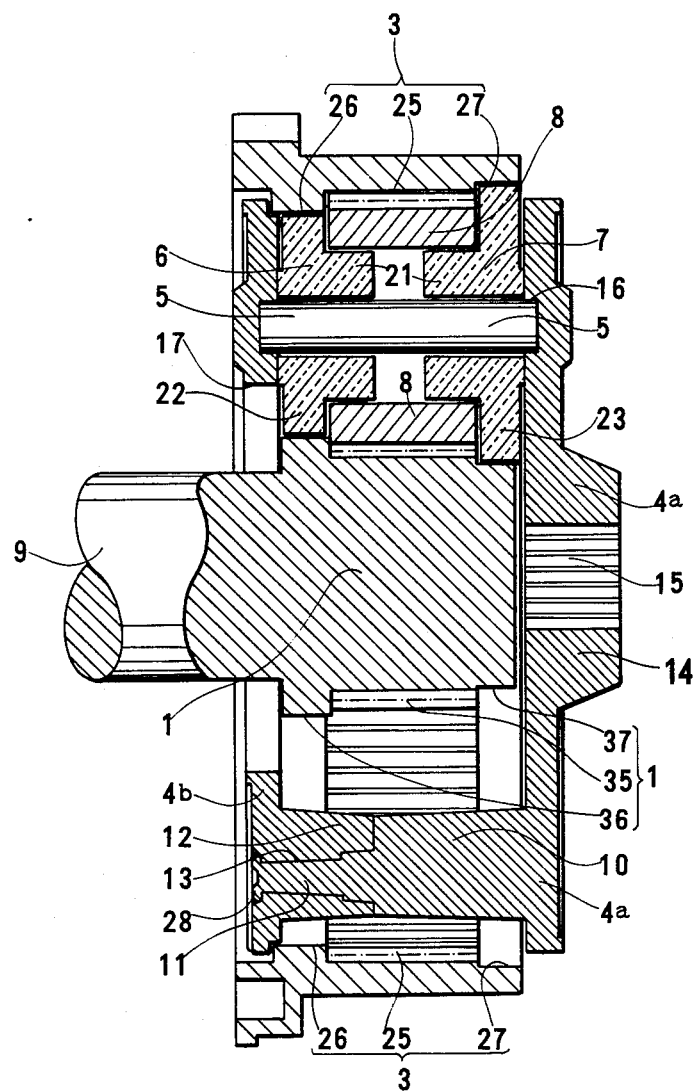
FIG. 3 is a sectional view taken along a line III—III in FIG. 1.
Figure 4:
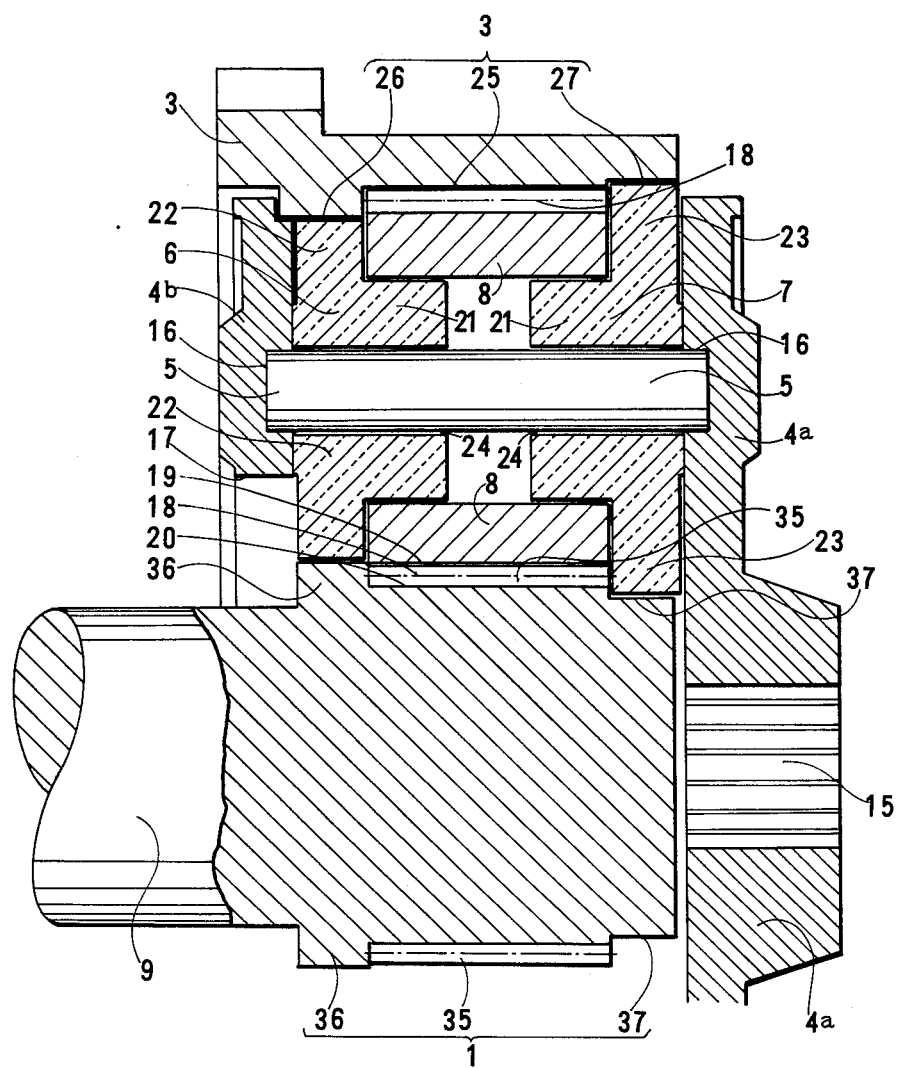
FIG. 4 is a enlarged sectional view of the engagement between a planetary gear and an outer inner-toothed gear.

In FIG. 3 and FIG. 4 the boundary between a blank part and a hatched part shows the tooth-root circle (19). The tooth-root circle is smaller than the pitch circle by 1.25 modules in radius.

On the contrary a tooth-edge circle (20) is larger than the pitch circle by 1 module in radius.

FIG. 4 shows an enlarged sectional view of engagement points among the sun gear (1), the planetary gears (2) and the outer inner-toothed gear (3).

As mentioned before, the planetary gear (2) consists of three articles—the planetary gear ring (8), the first planetary disc (6) and the second planetary disc (7). Two planetary discs (6) and (7) cooperate to support the inner surface of the planetary gear ring (8).

FIG. 5 is a perspective view of the first planetary disc (6). FIG. 6 is a perspective view of the second planetary disc (7).

The first planetary disc (6) has a smaller disc part (22) smaller than the tooth-root circle (19) of planetary gear. The inner cylindrical part (21) enters into the hole of the planetary gear ring (8) and supports the planetary gear ring (8) loosely.

The clearance between the inner surface of the gear ring (8) and the outer surface of the inner cylindrical part (21) is 0.18 to 0.32 mm in diameter in this example.

The second planetary disc (7) has a bigger disc part (23) bigger than the tooth-edge circle of planetary gear, and an inner cylindrical part (21). The inner cylindrical paft (21) plays the same role of the first planetary disc (6).

The planetary discs (6) and (7) have disc parts of different sizes. One is smaller than the tooth-root circle and another is bigger than the tooth-edge circle. However other sizes are same. On both discs (6) and (7), shaft holes (24) through which the planetary shafts (5) penetrate are perforated.

The clearances between the shaft holes (24) and the planetary shafts (5) are 0.05 to 0.118 mm in this example.

The outer inner-toothed gear (3) consists of three parts corresponding to the three articles of the planetary gear. However three parts can be made in a single body in the case of plastics.

The middle part of the outer inner-toothed gear (3) is a gear part (25) which engages with the planetary gear ring (8). Engagement points effectively lie on the pitch circle (18).

The sides parts of the outer inner-toothed gear (3) are cylindrical parts (26) and (27) which contact with and roll on the planetary discs (6) and (7). The sizes of the cylindrical parts (26) and (27) are different.

The smaller cylindrical part (26) is smaller than the tooth-edge circle of the outer inner-toothed gear in inner diameter. The smaller cylindrical part (26) contacts with and rolls on the smaller disc part (22) of the first planetary disc (6).

Size tolerance of the smaller cylindrical part (26) is $-0.09$ to $+0.2$ mm in this example.

The bigger cylindrical part (27) is bigger than the tooth-root circle of outer inner-toothed gear in inner diameter. The bigger cylindrical part (27) contacts with and rolls on the bigger disc part (23) of the second planetary disc (7). Size tolerance of the bigger cylindrical part (27) is −0.09 to +0.2 mm in this example.

The radial clearance between the shaft holes (24) and the planetary shaft (5) is more than 0.05 mm. Thus total displacement range of the planetary drscs (6) and (7) is more than 0.1 mm. Therefore if the errors of the cylindrical parts (26) and (27) is −0.09 mm, the rotations of the planetary discs (6) and (7) are not hindered by the cylindrical parts (26) and (27) of the outer inner toothed gear.

Shapes of other parts of the outer inner-toothed gear are arbitrary. In this example long grooves (32) and round cavities (33) are formed on the side where the sun shaft (9) exists. Slots (31) are formed on the outer stepped surface of the outer inner-toothed gear. Other part of the outer surface is a simple cylindrical surface. When this planetary gear assembly is fitted into a casing, screws will fix the slots (31) to forbid the relative rotation of the outer inner-toothed gear.

Although the outer inner-toothed gear (3) is asymmetric with regard to the axial direction in this example, symmetric outer surface of the outer inner-toothed gear is fully allowable the same as ordinary planetary gear assemblies. This invention does not require the asymmetry of the outer inner-toothed gear except the cylindrical parts.

With regard to the sun gear (1), not only an individual gear but also a gear part formed on a sun shaft (output shaft of motor or decelerator) are available.

In any case the sun gear must comprise a sun gear part (35), a smaller column part (37) on the extended side and a bigger column part (36) on the counter side.

If the sun gear is shaped on a sun shaft (9), the diameter of the shaft is arbitrary. FIG. 7 shows a sun shaft whose diameter is smaller than that of the bigger column part (36). FIG. 8 shows another sun shaft whose diameter is equal to that of the bigger column part (36).

Even a sun shaft which is larger than the bigger column part (36) in section is allowable although it is not shown in the figures.

The functions of three parts of the sun gear will be explained.

The sun gear part (35) transmits torques to the planetary gears engaging therewith.

The smaller column part (37) which is smaller than the tooth-root circle of sun gear contacts with and rolls on the circumferences of the bigger disc part (23) of the second planetary disc (7).

The bigger column part (36) which is larger than the tooth-edge circle of sun gear contacts with and rolls on the circumference of the smaller disc part (22) of the first planetary disc (6).

The column part (36) and (37) transmit radial forces to the planetary discs (6) and (7). This fact ensures the non-eccentric rotation of sun gear.

Advantages of this invention will be now explained.

(1) Abnormall fitting of sun gear is fully forbidden.

The sun gear (1) has a smaller column part (37) and a bigger column part (36) on sides of a sun gear part (35). If sun gear teeth are going to be inserted into erroneous tooth-valleys next to ordinary tooth-valleys of the planetary gear, the sun-center (center of sun gear) deviates from the planet-center (center of three or four planetary shafts).

The smaller column part (37) of the sun gear (1) will collide with the inner side surface of the bigger disc part (23) of the second planetary disc (7) of the planetary gear (2). Otherwise the bigger column part (36) of the sun gear (1) will collide with the external side surface of the smaller disc part (22) of the first planetary disc (6). Namely an occurrence of abnormal fitting is detected by these collisions.

FIG. 8 demonstrates the collisions between the sun gear and the planetary gears in abnormal fitting.

According to the inclination of sun gear, one or both of these collisions will happen without fail in abnormal fitting. In this case the sun gear (1) cannot enter the sun gear space because of the collisions.

Non-entrance of sun gear means an occurrence of misfit. Then the worker becomes aware of the occurrence of misfit. What the worker should do is to extract the sun gear (1) (as an individual gear or a sun shaft) and to insert again it in normal fitting.

If the sun gear can be inserted with full length into the sun gear space, the sun gear and the planetary gears are in normal fitting.

This invention can effectively prevent abnormal fitting between sun gear and planetary gears. Then this invention enables us to reduce the occurrence of inferior goods.

(2) This invention supresses strong engagements between gears or teeth intervention, because side columns, side discs and side cylindrical parts of the gears contact with each other and prevent deep engagement among the teeth. Any tooth-valley of any gear is not jammed in with a tooth at any time.

(3) The extinction of teeth intervention ensures low noise and high transmission efficiency.

(4) After-insertion of sun gear is possible partly because the planetary disc on the side for shaft insertion is smaller than the tooth-root circle of the planetary gear and partly because the column part on the extended side of sun gear is smaller than the tooth-root circle of sun gear.

Possibility of after-insertion of sun gear makes the sun-shaft-structure possible. Here the sun shaft means a shaft having a sun gear shaped on its end as shown in FIG. 7.

The sun-shaft-structure has big advantages. It can reduce the number of articles, because an individual sun gear is spared. Big shaft is applicable. Strong torque can be transmitted from the big shaft to the sun gear, because the gear and the shaft are shaped in a body.

Very small sun gear is available, because enough torque can be transmitted to the gear. Then this invention enables us to make the planetary gear assembly with high reduction rate, which is in inverse proportion to the size of sun gear.

(5) In the case of plastics, the outer inner-toothed gear can be made in a single body by plastic injection molding, because one side of the gear part (25) is a bigger cylindrical part (27) bigger than the tooth-root circle, which allows a metallic mold to be rid therefrom.

In the pitch-circle-disc type of planetary gear assembly an outer inner-toothed gear consists of three articles—a ring gear, and two discs.

On the contrary in this invention the outer inner-toothed gear is a single article. The centers of the gear part (25) and side cylindrical parts (26) and (27) is coincided within the accuracy of metallic mold. Probable errors of centers are much less than ones in the pitch-circle-disc type, in which three separate articles are connected by screws when the assembly is mounted in a casing.

(6) If the casing is made from elastic material and is apt to deform, the center of casing is not distinctly determined. This invention is also useful in this case. If the sun shaft (or the sun gear coupled with an input shaft) is supported at a definite position by bearings, the center of casing is reciprocally determined by the sun shaft. Namely after the sun shaft and an output shaft inserted into the carrier shaft hole (15) are sustained by bearings, the casing is fixed to some pertinent base by screws.

This is a new fixation method fully different from conventional methods. By this invention the centers of input and output shaft determine the center of casing. Then size tolerance of casing is greatly alleviated. This reduces the cost for manufacturing the casing.

Finally the materials of the articles will be explained.

(1) The planetary gear ring (8) is made from either metals or plastics. In the case of metal, steel, alminium, sintering alloy of iron, and zinc are available.

(2) The planetary discs (6) and (7) are made from plastics, sintering alloy of iron, or steel.

(3) The carrier is made from plastics, sintering alloy of iron, steel, zinc or alminium.

(4) The outer inner-toothed gear is manufactured by plastic injection molding or alminium die-casting.

(5) The individual sun gear is made from steel or sintering alloy of iron. The sun shaft is made from steel or plastics. In case of steel the sun gear is shaped by grinding and forging.

What is claimed is:

1. An asymmetric planetary gear assembly comprising a sun gear (1), three or four planetary gears (2) for engaging with the sun gear (1), an outer inner-toothed gear (3) engaging with the planetary gears (2) and a rotary carrier (4) supporting planetary shafts (5) piercing the planetary gears (2), characterized in that the planetary gear (2) consists of a planetary gear ring (8), a first planetary disc (6) having a smaller disc part (22) smaller than the tooth-root circle of planetary gear and an inner cylindrical part (21) sustaining the planetary gear ring (8) and a second planetary disc (7) having a bigger disc part (23) bigger than the tooth-edge circle of planetary gear and an inner cylindrical part (21) sustaining the planetary gear ring (8), the outer inner-toothed gear consists of a gear part (25) engaging with the planetary gear ring (8), a smaller cylindrical part (26) which is smaller than the tooth-edge circle of outer inner-toothed gear and contacts with the smaller disc part (22) of the first planetary disc (6), and a bigger cylindrical part (27) which is bigger than the tooth-root circle of outer inner-toothed gear and contacts with the bigger disc part (23) of the second planetary disc (7), and the sun gear (1) consists of a sun gear part (35) engaging with the planetary gear ring (8), a smaller column part (37) which is smaller than the tooth-root circle of sun gear and contacts with and rolls on the bigger disc part (23) of the second planetary disc (7) and a bigger column part (36) which is bigger than the tooth-edge circle of sun gear and contacts with and rolls on the smaller disc part (22) of the first planetary disc (6).

2. An asymmetric planetary gear assembly as claimed in claim (1), wherein the sun gear (1) is an individual gear.

3. An asymmetric planetary gear assembly as claimed in claim (1), wherein the sun gear (1) is shaped at an end of a sun shaft (9).

4. An asymmetric planetary gear assembly as claimed in claim (3), wherein the diameter of the sun shaft (9) is smaller than that of the bigger column part (36) of the sun gear (1).

5. An asymmetric planetary gear assembly as claimed in claim (3), wherein the diameter of the sun shaft (9) is equal to that of the bigger column part (36) of the sun gear (1).

6. An asymmetric planetary gear assembly as claimed in claim (1), wherein the outer inner-toothed gear is made by plastic injection molding.

7. An asymmetric planetary gear assembly as claimed in claim (1), wherein the outer inner-toothed gear is made by alminium die-casting.

* * * * *